UNITED STATES PATENT OFFICE.

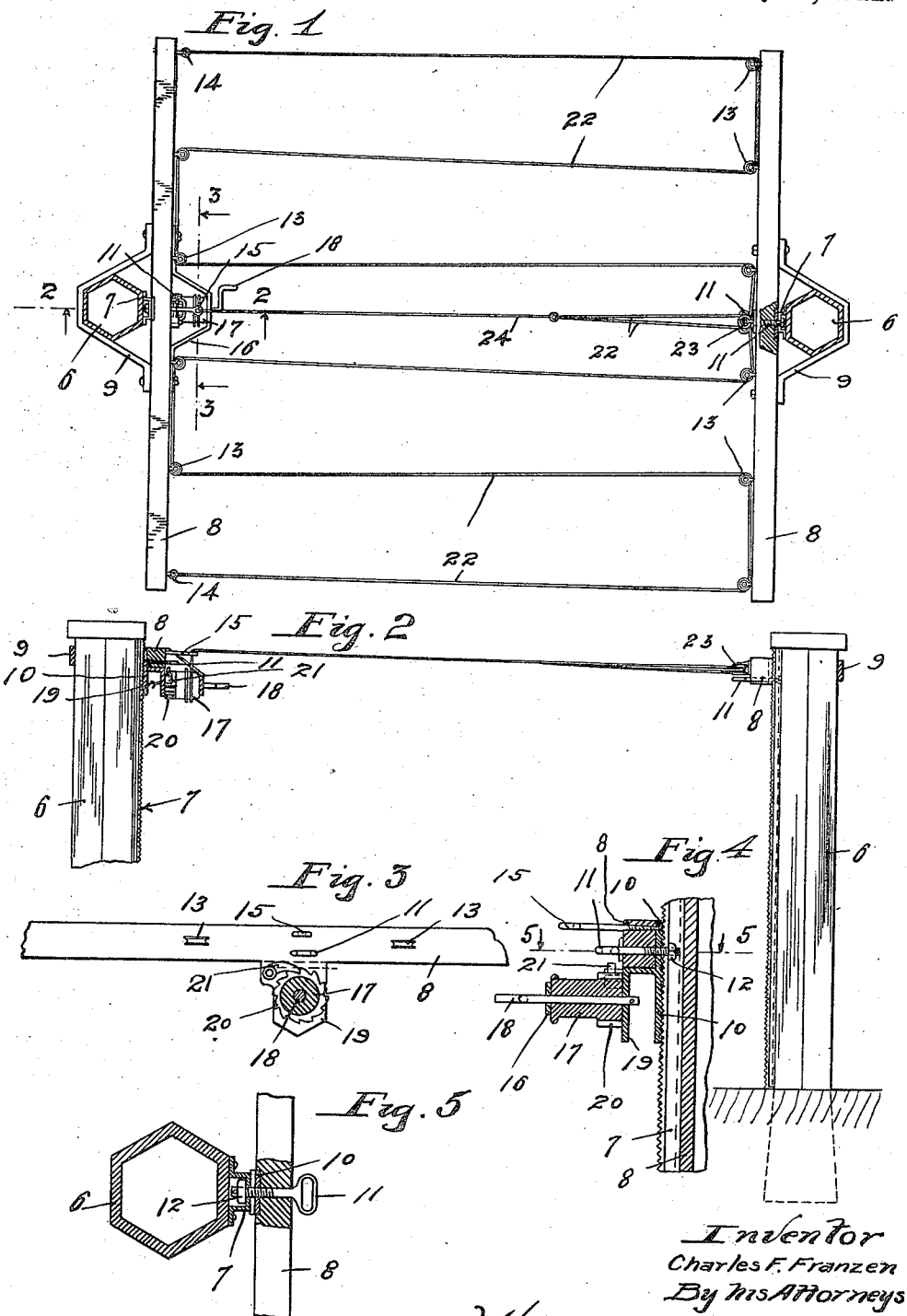

CHARLES F. FRANZEN, OF CHASKA, MINNESOTA.

CLOTHESLINE SUPPORT.

1,423,762.  Specification of Letters Patent.  Patented July 25, 1922.

Application filed August 1, 1921. Serial No. 488,840.

*To all whom it may concern:*

Be it known that I, CHARLES F. FRANZEN, am a citizen of the United States, residing at Chaska, in the county of Carver and State of Minnesota, have invented certain new and useful Improvements in Clothesline Supports; and I do hereby declare the following to be a full, clear, and exact description of the invention, such as will enable others skilled in the art to which it pertains to make and use the same.

My invention provides a simple and highly efficient clothes line support, capable of being quickly put up and taken down and which, when in use, is capable of supporting a very large amount of clothes within a very small space.

The preferred form of the support is illustrated in the accompanying drawings, wherein like characters indicate like parts throughout the several views; but it will be understood that the construction is capable of modification within the scope of my invention as herein disclosed and claimed.

Two approximately parallel horizontal line-supporting bars are mounted on suitable posts for vertical adjustments and are provided with line guides. Lines, preferably in the form of wires or small wire cables, are attached to one of the supporting bars, extended back and forth through the guides thereon and are attached to a windlass drum mounted on one of the said bars and provided with means for locking it in different adjustments so as to keep the line or lines under tension. There is a novel and important arrangement of the lines and the manner of their connection to the windlass drum; and there are also other novel features, all as will hereinafter more fully appear.

Referring to the drawings:

Fig. 1 is a plan view with some parts sectioned, showing the complete clothes line support or rack;

Fig. 2 is a view partly in elevation, but with some parts sectioned on the line 2—2 of Fig. 1;

Fig. 3 is a fragmentary section taken on the line 3—3 of Fig. 1;

Fig. 4 is an enlarged section taken approximately on the same line as Fig. 2; and Fig. 5 is a section on the line 5—5 of Fig. 4, some parts being removed and the parts shown being on a larger scale.

For supporting the line-supporting bar, I preferably use two posts 6, the lower ends of which are imbedded in the ground and suitably anchored therein. These posts, as shown, are hollow sheet metal structures bent hexagonal in cross section and, to the opposing inner faces thereof, are secured channel shaped upright bars 7, the exposed faces of which are corrugated or otherwise roughened.

The line-supporting bars 8 are provided with anchoring yokes 9 that embrace the respective posts 6 and quite loosely fit the same. For engagement with the corrugated surfaces of the bars 7, said bars 8 are provided with rigidly secured corrugated plates 10, and a clamping screw 11 is passed through each bar 8, its plate 10 and through the vertical channel formed in or between the members of the co-operating bars 7. Within the channels of said bars 7, the clamping screws 11 are provided with nuts 12.

When the clamping screws 11 are loosened, the bars 8 may be freely adjusted vertically on the respective posts, but when said screws are tightened, said bars 8 will be locked in the desired vertical adjustments.

The bars 8 are provided with guides 13 in the form of pulley-equipped brackets, and one of said bars, towit, as shown, the left-hand bar 8, is provided with anchoring eye-bolts 14 and with a central guide in the form of an eye-bolt 15. This same bar 8, on its inner face, is provided with a yoke-like supporting bracket 16, within which is a windlass drum 17, the crank shaft 18 of which is journaled in the bracket 16 and in a depending bracket 19 secured to the bottom of the central portion of said bar 8. The windlass drum 17 is provided with a ratchet wheel 20 with which normally engages a retaining dog 21 pivoted to said bracket 19.

Two main lines 22 are attached, one to each of the eye bolts 14, and from thence are extended back and forth over the guides 13 on the two bars 8 and are brought substantially together and passed through or over a centrally located guide 23 on the right-hand bar 8. The two inner ends of these cables 22 are attached to a common pulling cable or line 24 that is passed through the central guide 15 on the left-hand bar 8 and from thence is brought down and attached to the windlass cable 17.

With the above arrangement, it is evident that when the lines or cables are loose and the clamping screws 11 are loosened up, the two line-supporting bars 8 may be adjusted to any desired height.

When the bars 8 are properly positioned and secured, the lines can be quickly tightened by winding of the cable or line 4 on the windlass drum; and under this winding action, both of the lines or cables 22 will be equally tightened or stretched because they will be simultaneously pulled upon and the two bars 8 will oscillate slightly in a horizontal plane if necessary to equalize the strain on the two cables 22. Hence, the bars 8, by their slight oscillatory movements on the posts, act as equalizers of the strain on the two cables or lines.

The clothes line support or rack described may be manufactured at small cost and easily erected and is adapted for use in many places, but will be found especially desirable for use in connection with flat buildings, apartment houses and elsewhere where there is not much ground available for the hanging up of clothes and where it is, therefore, very desirable for a large amount of clothes to be hung within small space or area.

One purpose of making the lines and supporting bars vertically adjustable is to permit the same to be so lowered as to afford a rack upon which carpets, mattresses and the like may be laid or spread above but close to the ground and, hence, easily and thoroughly cleaned.

What I claim is:

1. A clothes line support comprising laterally spaced line-supporting bars having means for attachment to supporting posts or the like and provided on their opposing faces with longitudinally spaced line guides, a line-tightening device on one of said bars, two main lines attached to one of said bars and passed back and forth over the guides on the two bars, and a common tightening line attached to the inner ends of said main lines and to said tightening device.

2. A clothes line support comprising two laterally spaced line-supporting bars having anchoring yokes adapted to embrace supporting posts and provided on their opposing faces with longitudinally spaced line guides, one of said bars having a windlass drum and a co-operating ratchet lock mounted thereon, two main lines attached to one of said bars and passed back and forth over the guides on two bars, and a common tightening line attached to the inner ends of said main lines and to said windlass drum.

3. A clothes line support comprising anchored upright posts having corrugated surfaces on their opposing faces, laterally spaced line-supporting bars having corrugated surfaces engageable with the corrugated surfaces of said posts, means for clamping said corrugated surfaces together to secure said bars in different vertical adjustments, a line-tightening device on one of said bars, and a line attached to and extended between said two bars and attached to said tightening device.

In testimony whereof I affix my signature.

CHARLES F. FRANZEN.